United States Patent
Aoyama (10) Patent No.: US 11,746,468 B2
(45) Date of Patent: Sep. 5, 2023

(54) DEFIBRATING METHOD, FIBER BODY FORMING METHOD, AND DEFIBRATING MACHINE

(71) Applicant: SEIKO EPSON CORPORATION, Tokyo (JP)

(72) Inventor: Tetsuya Aoyama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 150 days.

(21) Appl. No.: 17/101,017

(22) Filed: Nov. 23, 2020

(65) Prior Publication Data

US 2021/0156087 A1    May 27, 2021

(30) Foreign Application Priority Data

Nov. 25, 2019  (JP) .................. 2019-212097

(51) Int. Cl.
| | |
|---|---|
| *D21B 1/06* | (2006.01) |
| *D21B 1/02* | (2006.01) |
| *C08K 5/19* | (2006.01) |
| *C08L 71/02* | (2006.01) |
| *C08L 83/12* | (2006.01) |

(52) U.S. Cl.
CPC ............. *D21B 1/061* (2013.01); *C08K 5/19* (2013.01); *C08L 71/02* (2013.01); *D21B 1/021* (2013.01); *C08L 83/12* (2013.01)

(58) Field of Classification Search
CPC .......... D21B 1/061; D21B 1/021; C08K 5/19; C08L 71/02; C08L 83/12
See application file for complete search history.

(56) References Cited

U.S. PATENT DOCUMENTS

| | | | |
|---|---|---|---|
| 3,499,823 A | * | 3/1970 | Croon .................. D21H 17/66 162/164.7 |
| 6,273,995 B1 | | 8/2001 | Ikeda et al. |
| 8,882,965 B2 | | 11/2014 | Yamagami et al. |
| 2017/0114484 A1 | | 4/2017 | Tsujino |

FOREIGN PATENT DOCUMENTS

| | | |
|---|---|---|
| CN | 101939481 A | 1/2011 |
| CN | 106471170 A | 3/2017 |
| EP | 2 236 665 A1 | 10/2010 |
| JP | H02-041451 A | 2/1990 |
| JP | H07-119060 A | 5/1995 |
| JP | 2004-019023 A | 1/2004 |
| JP | 2008-121138 A | 5/2008 |
| JP | 2012-144826 A | 8/2012 |
| JP | 2019-001938 A | 1/2019 |
| WO | 98/03730 A1 | 1/1998 |

* cited by examiner

*Primary Examiner* — Cephia D Toomer
(74) *Attorney, Agent, or Firm* — Global IP Counselors, LLP

(57) ABSTRACT

A defibrating method includes the steps of: preparing a material which contains fibers and a compound represented by the following formula (1); and defibrating the material.

$$RO(O)_m(PO)_nH \qquad (1)$$

In the formula, R represents an alkyl or an alkenyl group having 6 to 22 carbon atoms or an alkylaryl group including an alkyl group which has 4 to 20 carbon atoms, E represents an ethylene group, P represents a propylene group, m and n each represent an average number of added moles, m represents a numerical value of 0 to 20, n represents a numerical value of 1 to 10, and $(EO)_m(PO)_n$ represents a block addition structure.

4 Claims, 5 Drawing Sheets

|  | LIQUID 1 | LIQUID 2 | LIQUID 3 | LIQUID 4 | LIQUID 5 | LIQUID 6 | LIQUID 7 | LIQUID 8 |
|---|---|---|---|---|---|---|---|---|
| POAAE1 | 2 | 2 | – | – | – | – | – | – |
| POAAE2 | – | – | 2 | – | – | – | – | – |
| POAAE3 | – | – | – | 2 | – | – | – | – |
| POAAE4 | – | – | – | – | 2 | – | – | – |
| POAAE5 | – | – | – | – | – | 2 | – | – |
| OLFINE E1010 | – | – | – | – | – | – | 2 | – |
| BYK349 | – | – | – | – | – | – | – | 2 |
| LIPOQUAD T30 | – | 0.5 | – | – | – | – | – | – |
| IPA | 10 | 10 | 10 | 10 | 10 | 10 | 10 | 10 |
| WATER | 88 | 87.5 | 88 | 88 | 88 | 88 | 88 | 88 |
| TOTAL | 100 | 100 | 100 | 100 | 100 | 100 | 100 | 100 |

FIG. 6

| | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 | REFERENCE EXAMPLE |
|---|---|---|---|---|---|---|---|---|---|---|---|---|---|---|---|
| TYPE OF LIQUID | LIQUID 1 | LIQUID 1 | LIQUID 1 | LIQUID 1 | LIQUID 2 | LIQUID 3 | LIQUID 4 | LIQUID 5 | LIQUID 6 | LIQUID 7 | LIQUID 7 | LIQUID 8 | LIQUID 8 | - | - |
| LIQUID MASS | 5.0 | 20.0 | 33.0 | 33.0 | 33.0 | 33.0 | 33.0 | 33.0 | 33.0 | 33.0 | 33.0 | 33.0 | 33.0 | - | - |
| ADDITIVE MASS | 2.5 | 10.0 | 16.5 | 16.5 | 16.5 | 16.5 | 16.5 | 16.5 | 16.5 | 16.5 | 16.5 | 16.5 | 16.5 | - | - |
| RAW MATERIAL MOISTURE CONTENT [%] | 7 | 7 | 7 | 7 | 7 | 7 | 7 | 7 | 7 | 7 | 7 | 7 | 7 | 7 | 7 |
| DEFIBRATING TIME [SECS] | 20 | 20 | 20 | 60 | 60 | 60 | 60 | 60 | 60 | 20 | 60 | 20 | 60 | 60 | DEFIBRATED WITH WATER |
| DEFIBRATED STATE | A | A | A | A | A | A | A | A | A | C | B | B | B | C | - |
| AVERAGE FIBER LENGTH [mm] | 0.807 | 0.821 | 0.839 | 0.823 | 0.847 | 0.817 | 0.838 | 0.829 | 0.831 | - | 0.795 | - | 0.798 | 0.789 | 0.856 |

DEFIBRATING METHOD, FIBER BODY FORMING METHOD, AND DEFIBRATING MACHINE

The present application is based on, and claims priority from JP Application Serial Number 2019-212097, filed Nov. 25, 2019, the disclosure of which is hereby incorporated by reference herein in its entirety.

BACKGROUND

1. Technical Field

The present disclosure relates to a defibrating method, a fiber body forming method, and a defibrating machine.

2. Related Art

In order to achieve reduction in size and energy saving, a dry type fiber body forming apparatus in which the use of water is reduced as much as possible has been proposed. In the fiber body forming apparatus as described above, a raw material containing fibers is defibrated using a dry type defibrating machine.

For example, JP-A-2019-1938 has disclosed that a cellulose raw material is mixed with a silicone surfactant and is then mechanically defibrated.

When a raw material containing fibers is defibrated by the dry type defibrating machine as described above, large energy is required to break hydrogen bonds between the fibers.

SUMMARY

According to an aspect of the present disclosure, there is provided a defibrating method comprising the steps of: preparing a material which contains fibers and a compound represented by the following formula (1); and defibrating the material.

$$RO(EO)_m(PO)_nH \qquad (1)$$

In the formula, R represents an alkyl or an alkenyl group having 6 to 22 carbon atoms or an alkylaryl group including an alkyl group which has 4 to 20 carbon atoms, E represents an ethylene group, P represents a propylene group, m and n each represent an average number of added moles, m represents a numerical value of 0 to 20, n represents a numerical value of 1 to 10, and $(EO)_m(PO)_n$ represents a block addition structure.

In the defibrating method according to the above aspect, R may have 8 to 16 carbon atoms.

In the defibrating method according to the above aspect, in the step of preparing a material, the material may be prepared such that the compound is contained at 2.5 to 16.5 percent by mass with respect to the fibers.

In the defibrating method according to the above aspect, the material may further contain a cationic surfactant.

According to another aspect of the present disclosure, there is provided a fiber body forming method comprising the steps of: adding a compound represented by the following formula (1) to a raw material containing fibers; forming a defibrated material by defibrating the raw material to which the compound is added; adding a binding material to the defibrated material; depositing the defibrated material to which the binding material is added; and heating the defibrated material which is deposited.

$$RO(EO)_m(PO)_nH \qquad (1)$$

In the formula, R represents an alkyl or an alkenyl group having 6 to 22 carbon atoms or an alkylaryl group including an alkyl group which has 4 to 20 carbon atoms, E represents an ethylene group, P represents a propylene group, m and n each represent an average number of added moles, m represents a numerical value of 0 to 20, n represents a numerical value of 1 to 10, and $(EO)_m(PO)_n$ represents a block addition structure.

In the fiber body forming method according to the above aspect, R may have 8 to 16 carbon atoms.

In the fiber body forming method according to the above aspect, in the step of adding a compound, the compound may be added at 2.5 to 16.5 percent by mass with respect to the fibers.

The fiber body forming method according to the above aspect may further comprise, before the step of forming a defibrated material, a step of adding a cationic surfactant to the raw material.

According to another aspect of the present disclosure, there is provided a defibrating machine comprising: an addition portion which adds a compound represented by the following formula (1) to a raw material containing fibers; and a defibrating portion which defibrates the raw material to which the compound is added.

$$RO(EO)_m(PO)_nH \qquad (1)$$

In the formula, R represents an alkyl or an alkenyl group having 6 to 22 carbon atoms or an alkylaryl group including an alkyl group which has 4 to 20 carbon atoms, E represents an ethylene group, P represents a propylene group, m and n each represent an average number of added moles, m represents a numerical value of 0 to 20, n represents a numerical value of 1 to 10, and $(EO)_m(PO)_n$ represents a block addition structure.

In the defibrating machine according to the above aspect, R may have 8 to 16 carbon atoms.

In the defibrating machine according to the above aspect, the addition portion may add the compound at 2.5 to 16.5 percent by mass with respect to the fibers.

In the defibrating machine according to the above aspect, the addition portion may further add a cationic surfactant to the raw material, and the defibrating portion may defibrates the raw material to which the compound and the cationic surfactant are added.

DESCRIPTION OF EXEMPLARY EMBODIMENTS

Hereinafter, preferable embodiments of the present disclosure will be described in detail with reference to the drawings. In addition, the following embodiments do not unreasonably limit the content of the present disclosure described in the claims. In addition, all the structures described below are not always required to be essential constituent elements of the present disclosure.

1. Defibrating Machine

Figure 1:
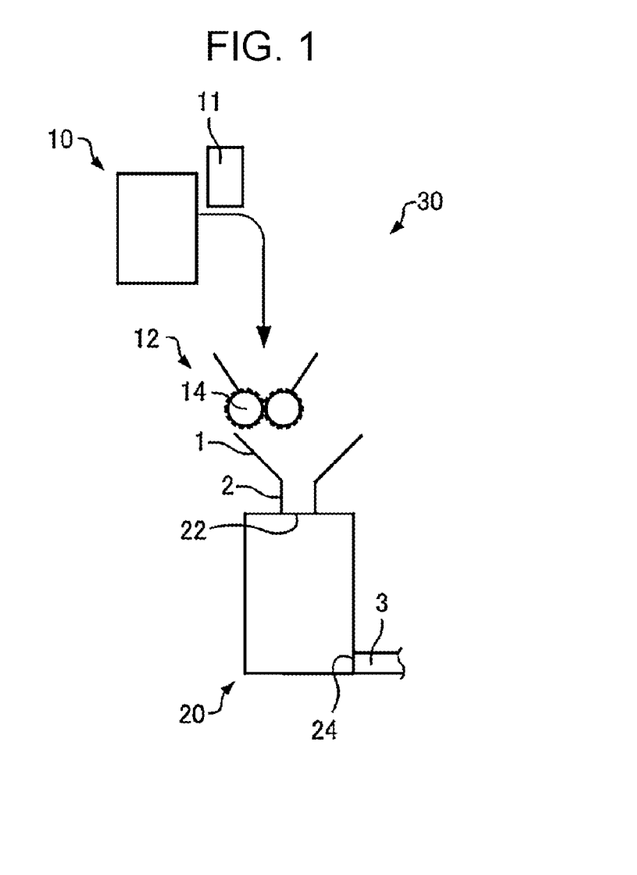
FIG. 1 is a schematic view showing a defibrating machine according to this embodiment.

First, a defibrating machine according to this embodiment will be described with reference to the drawing. FIG. 1 is a schematic view showing a defibrating machine 30 according to this embodiment.

As shown in FIG. 1, to the defibrating machine 30, for example, a raw material to be defibrated is supplied from a supply portion 10. The supply portion 10 supplies the raw material to the defibrating machine 30. The supply portion 10 is, for example, an automatic feeder to continuously feed the raw material to the defibrating machine 30. The raw material to be supplied by the supply portion 10 is a material, such as waste paper and/or a pulp sheet, containing fibers.

As shown in FIG. 1, the defibrating machine 30 includes, for example, an addition portion 11, a coarsely pulverizing portion 12, and a defibrating portion 20. Those portions will be described in this order.

1.1. Addition Portion

The addition portion 11 adds a compound represented by the following formula (1) to a raw material containing fibers which is supplied from the supply portion 10.

$$RO(EO)_m(PO)_nH \qquad (1)$$

In the formula, R represents an alkyl or an alkenyl group having 6 to 22 carbon atoms or an alkylaryl group including an alkyl group which has 4 to 20 carbon atoms, E represents an ethylene group, P represents a propylene group, m and n each represent an average number of added moles, m represents a numerical value of 0 to 20, n represents a numerical value of 1 to 10, and $(EO)_m(PO)_n$ represents a block addition structure.

The compound represented by the formula (1) is a polyoxyalkylene alkyl ether and is also called "POAAE" in some cases.

In the formula (1), the carbon number of R is 8 to 16. When the carbon number is 8 or more, a hydrophobic property of POAAE can be enhanced, and a bonding force of a hydrogen bond between fibers can be decreased. Hence, the raw material can be defibrated at low energy. When the carbon number is 16 or less, a decrease in paper strength due to the addition of POAAE can be suppressed. In addition, a sheet thus formed is suppressed from being changed into oily paper.

The addition portion 11 adds POAAE, for example, at 2.5 to 16.5 percent by mass with respect to the fibers (fibers in a dried state) contained in the raw material. When 2.5 percent by mass or more of POAAE is added with respect to the fibers, the raw material can be defibrated at low energy. When 16.5 percent by mass or less of POAAE is added with respect to the fibers, the decrease in paper strength due to the addition of POAAE can be suppressed. In addition, a sheet thus formed can be suppressed from being changed into oily paper.

The addition portion 11 may add a liquid formed by dissolving or dispersing POAAE in a solvent to the raw material. The solvent preferably contains water. The solvent may also contain, besides water, an alcohol, such as isopropyl alcohol. When the addition portion 11 adds a liquid containing POAAE to the raw material, a moisture content of the raw material to which the liquid is added may be 13% or less in an environment at a temperature of 23° C. and a relative humidity of 50%. Even if the moisture content is 13% or less, when POAAE is adhered to the raw material upon defibration thereof, the raw material can be defibrated at low energy.

The addition portion 11 may further add a cationic surfactant to the raw material. The addition portion 11 may also add a liquid containing POAAE and a cationic surfactant to the raw material. Since the cationic surfactant is added to the raw material, a sheet having a high paper strength can be formed.

As the cationic surfactant, for example, there may be mentioned a primary, a secondary, or a tertiary amine salt compound, an alkylamine salt, a dialkylamine salt, an aliphatic amine salt, a benzalkonium salt, a quaternary ammonium salt, a quaternary alkylammonium salt, an alkylpyridinium salt, a sulfonium salt, a phosphonium salt, an onium salt, or an imidazolium salt.

In particular, as the cationic surfactant, for example, there may be mentioned stearyl trimethyl ammonium chloride; a hydrochloride salt or an acetate salt of laurylamine, a coconut amine, or a rosin amine; lauryl trimethyl ammonium chloride, cetyl trimethyl ammonium chloride, benzyl tributyl ammonium chloride, benzalkonium chloride, dimethyl ethyl lauryl ammonium ethyl sulfate, dimethyl ethyl octyl ammonium ethyl sulfate, trimethyl lauryl ammonium hydrochloride, cetyl pyridinium chloride, cetyl pyridinium bromide, dihydroxyethyl laurylamine, decyl dimethyl benzyl ammonium chloride, dodecyl dimethyl benzyl ammonium chloride, tetradecyl dimethyl ammonium chloride, hexadecyl dimethyl ammonium chloride, or octadecyl dimethyl ammonium chloride. In particular, as the cationic surfactant, stearyl trimethyl ammonium chloride is preferably used.

When the addition portion 11 adds a liquid containing POAAE and a cationic surfactant to the raw material, the content of POAAE in the liquid is, for example, 0.1 to 10 percent by mass and preferably 1.0 to 3.0 percent by mass.

Although the addition portion 11 is not particularly limited as long as capable of adding POAAE to the raw material, for example, a roller, a spray, or an ink jet head may be mentioned.

1.2. Coarsely Pulverizing Portion

The coarsely pulverizing portion 12 cuts the raw material supplied by the supply portion 10 into small pieces in a gas atmosphere such as in the air. The small pieces each have a several centimeters square shape. In the example shown in the drawing, the coarsely pulverizing portion 12 has coarsely pulverizing blades 14, and by the coarsely pulverizing blades 14, the raw material to be charged can be cut. As the coarsely pulverizing portion 12, for example, a shredder may be used. The raw material cut by the coarsely pulverizing portion 12 is received by a hopper 1 and is then transported to the defibrating portion 20 through a tube 2.

In addition, in the example shown in the drawing, although cutting the raw material to which POAAE is added, the coarsely pulverizing portion 12 may cuts the raw material before POAAE is added thereto. In this case, the addition portion 11 adds POAAE to the raw material which is already cut into small pieces.

1.3. Defibrating Portion

The defibrating portion 20 defibrates the raw material cut by the coarsely pulverizing portion 12. In particular, the defibrating portion 20 defibrates the raw material to which POAAE and a cationic surfactant are added and which is cut by the coarsely pulverizing portion 12. In this step, the "defibrate" indicates that a raw material in which fibers are bound to each other is disentangled into fibers separated from each other. The defibrating portion 20 also has a function to separate resin particles and substances, such as an ink, a toner, and a blurring inhibitor, which are adhered to the raw material from the fibers.

A material passing through the defibrating portion 20 is called a "defibrated material". The "defibrated material" may contain in some cases, besides disentangled defibrated fibers, resin particles, colorants, such as an ink and a toner, and additives, such as a blurring inhibitor and a paper strength enhancer, which are separated from the fibers when the fibers are disentangled. The disentangled defibrated material is in the form of strings. The disentangled defibrated material may be not entangled with other disentangled fibers, that is, may be independently present or may be entangled with other disentangled defibrated material to form aggregates, that is, may be present in the form of damas.

The defibrating portion 20 performs a dry defibration. A treatment, such as defibration, which is performed not in a liquid but in a gas, such as in the air, is called a dry treatment. As the defibrating portion 20, for example, an impellor mill is used. The defibrating portion 20 has a function to generate an air stream which sucks the raw material and discharges the defibrated material. Accordingly, by the air stream thus generated as described above, the defibrating portion 20 can perform a defibrating treatment by sucking the raw material from an inlet port 22 together with the air stream and then can transport the defibrated material to a discharge port 24. The defibrated material passing through the defibrating portion 20 is transferred through a tube 3.

1.4. Effect

The defibrating machine 30 has, for example, the following effect.

The defibrating machine 30 includes the addition portion 11 which adds POAAE to the raw material containing fibers and the defibrating portion 20 which defibrates the raw material to which POAAE is added. Hence, compared to the case in which no POAAE is added, by the defibrating machine 30, the raw material can be defibrated at low energy (see "5. EXAMPLES AND COMPARATIVE EXAMPLES" which will be described later in detail). Since POAAE intrudes between the fibers and disturbs the formation of hydrogen bonds therebetween, the density of the raw material can be decreased, and hence, the raw material can be defibrated at low energy. When the raw material can be defibrated at low energy, energy saving and reduction in size of the apparatus can be performed.

Furthermore, compared to the case in which no POAAE is added, the defibrating machine 30 can perform defibration while the fibers are each maintained to have a long length (see "5. EXAMPLES AND COMPARATIVE EXAMPLES" which will be described later in detail). Hence, a sheet having a high paper strength can be formed.

In the defibrating machine 30, the carbon number of R of POAAE may be 8 to 16. Hence, by the defibrating machine 30, the raw material can be defibrated at low energy, and in addition, a decrease in paper strength due to the addition of POAAE can be suppressed.

In the defibrating machine 30, the addition portion 11 may add 2.5 to 16.5 percent by mass of POAAE with respect to the fibers. Hence, by the defibrating machine 30, the raw material can be defibrated at low energy, and in addition, the decrease in paper strength due to the addition of POAAE can be suppressed.

In the defibrating machine 30, the addition portion 11 adds a cationic surfactant to the raw material, and the defibrating portion 20 defibrates the raw material to which POAAE and the cationic surfactant are added. Hence, compared to the case in which no cationic surfactant is added, by the defibrating machine 30, a sheet having a high paper strength can be formed.

2. Defibrating Method

Figure 2:
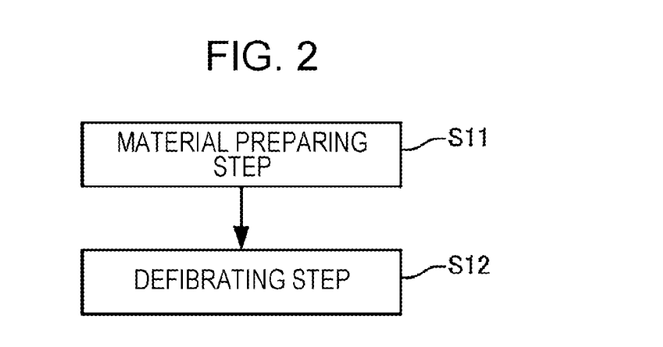
FIG. 2 is a flowchart illustrating a defibrating method according to this embodiment.

Next, a defibrating method according to this embodiment will be described with reference to the drawing. FIG. 2 is a flowchart illustrating the defibrating method according to this embodiment.

The defibrating method according to this embodiment is performed using the defibrating machine 30 described above. In addition, the defibrating method according to this embodiment may also be performed using a machine other than the defibrating machine 30.

As shown in FIG. 2, the defibrating method according to this embodiment comprises: a material preparing step (STEP S11) of preparing a material containing fibers and POAAE and a defibrating step (STEP S12) of defibrating the material.

The material preparing step (STEP S11) is performed, for example, using the supply portion 10 and the addition portion 11. The material preparing step may prepare a material containing 2.5 to 16.5 percent by mass of POAAE with respect to the fibers. The material may further contain a cationic surfactant.

The defibrating step (STEP S12) is performed, for example, using the defibrating portion 20 of the defibrating machine 30.

Besides the steps described above, the defibrating method according to this embodiment may further comprise, for example, a step of cutting the material by the coarsely pulverizing portion 12.

In the defibrating method according to this embodiment, as described in "1. DEFIBRATING MACHINE", the raw material can be defibrated at low energy.

Furthermore, in the defibrating method according to this embodiment, for example, when the material preparing step (STEP S11) is not performed immediately before the defibrating step (STEP S12) but is performed at least one time in advance, old paper to which POAAE is added can be stored. In addition, in accordance with a necessary amount, the old paper to which POAAE is added can be defibrated. Accordingly, the degree of operation freedom can be improved, and the efficiency thereof can also be improved.

3. Fiber Body Forming Apparatus

Figure 3:
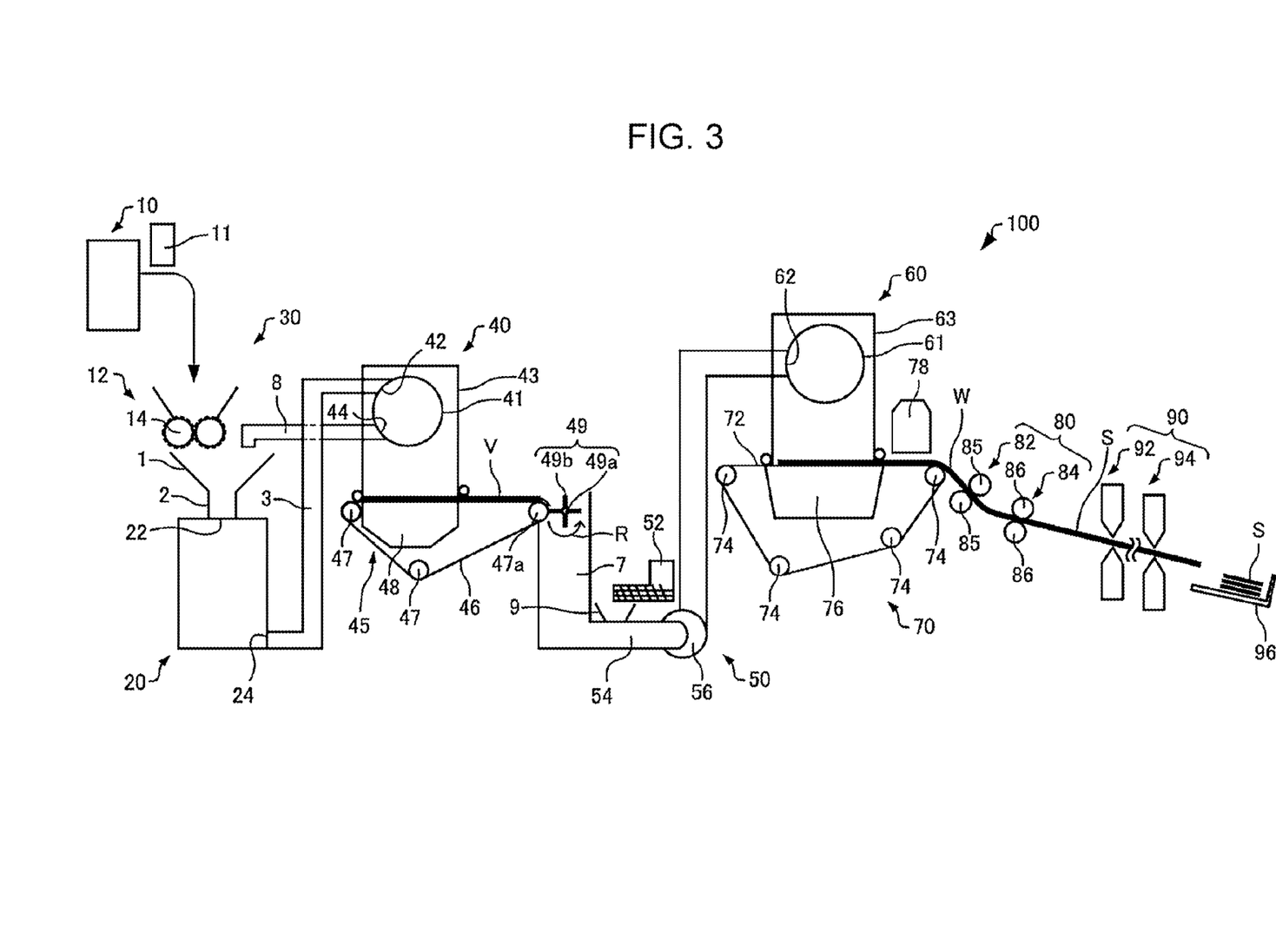
FIG. 3 is a schematic view showing a fiber body forming apparatus according to this embodiment.

Next, a fiber body forming apparatus according to this embodiment will be described with reference to the drawing. FIG. 3 is a schematic view showing a fiber body forming apparatus 100 according to this embodiment.

As shown in FIG. 3, the fiber body forming apparatus 100 comprises, for example, the defibrating machine 30. Furthermore, the fiber body forming apparatus 100 comprises, for example, a sorting portion 40, a first web forming portion 45, a rotation body 49, a mixing portion 50, a deposition portion 60, a second web forming portion 70, a sheet forming portion 80, and a cutting portion 90.

The sorting portion 40 introduces the defibrated material which is defibrated by the defibrating machine 30 from an inlet port 42 and then sorts the defibrated material by the lengths of the fibers. The sorting portion 40 includes a drum portion 41 and a housing portion 43 receiving the drum portion 41. As the drum portion 41, for example, a sieve is used. The drum portion 41 has a net and can sort fibers and/or particles which are smaller than an opening size of this net, that is, a first sorted material passing through the net, and fibers, non-defibrated pieces, and/or damas which are larger than the opening size of the net, that is, a second sorted material not passing through the net. For example, the first sorted material is transported to the mixing portion 50 through a tube 7. The second sorted material is returned to the defibrating portion 20 from a discharge port 44 through a tube 8. In particular, the drum portion 41 is a cylindrical sieve rotatably driven by a motor. As the net of the drum portion 41, for example, there may be used a metal net, an expanded metal formed by expanding a metal plate provided with cut lines, or a punched metal in which holes are formed in a metal plate by a press machine or the like.

The first web forming portion 45 transports the first sorted material passing through the sorting portion 40 to the tube 7. The first web forming portion 45 includes a mesh belt 46, tension rollers 47, and a suction mechanism 48.

The suction mechanism 48 can suck the first sorted material which passes through openings of the sorting portion 40 and which is dispersed in air onto the mesh belt 46. The first sorted material is deposited on the moving mesh belt 46 to form a web V. Basic structures of the mesh belt 46, the tension rollers 47, and the suction mechanism 48 are similar to those of a mesh belt 72, tension rollers 74, and a suction mechanism 76 of the second web forming portion 70 which will be described later.

Since passing through the sorting portion 40 and the first web forming portion 45, the web V is formed so as to be softly expanded with a large amount of air incorporated therein. The web V deposited on the mesh belt 46 is charged in the tube 7 and is then transported to the mixing portion 50.

The rotation body 49 can cut the web V. In the example shown in the drawing, the rotation body 49 includes a base portion 49a and protruding portions 49b protruding from the base portion 49a. The protruding portions 49b each have, for example, a plate shape. In the example shown in the drawing, four protruding portions 49b are provided with regular intervals. When the base portion 49a is rotated in a direction R, the protruding portions 49b can be rotated around the base portion 49a. Since the web V is cut by the rotation body 49, for example, the change in amount of the defibrated material per unit time to be supplied to the mixing portion 50 can be reduced.

The rotation body 49 is provided in the vicinity of the first web forming portion 45. In the example shown in the drawing, the rotation body 49 is provided in the vicinity of a tension roller 47a located downstream in a path of the web V. The rotation body 49 is provided at a position at which the protruding portion 49b can be brought into contact with the web V and cannot be brought into contact with the mesh belt 46 on which the web V is deposited. Accordingly, the mesh belt 46 can be suppressed from being abraded by the protruding portions 49b. The shortest distance between the mesh belt 46 and the protruding portion 49b is, for example, 0.05 to 0.5 mm. This is a distance at which the web V can be cut with no damage on the mesh belt 46.

The mixing portion 50 mixes the first sorted material passing through the sorting portion 40 and additives containing a resin. The mixing portion 50 includes an additive supply portion 52 supplying the additives, a tube 54 transporting the first sorted material and the additives, and a blower 56. In the example shown in the drawing, the additives are supplied from the additive supply portion 52 to the tube 54 through a hopper 9. The tube 54 is coupled to the tube 7.

In the mixing portion 50, an air stream is generated by the blower 56, and the first sorted material and the additives can be transported through the tube 54 while being mixed with each other. In addition, a mechanism to mix the first sorted material and the additives is not particularly limited, and for example, a mechanism in which stirring is performed by at least one high speed rotational blade or a mechanism, such as a V-type mixer, which uses rotation of a container may be used.

As the additive supply portion 52, a screw feeder as shown in FIG. 3 or a disc feeder not shown may be used. The additives to be supplied from the additive supply portion 52 include a resin functioning as a binding material which binds fibers. When the resin is supplied, the fibers are not bound to each other. The resin is melted when passing through the sheet forming portion 80, so that the fibers are bound together.

The resin supplied from the additive supply portion 52 includes a thermoplastic resin or a thermosetting resin, and for example, there may be mentioned an acrylonitrile styrene (AS) resin, an acrylonitrile butadiene styrene (ABS) resin, a polypropylene, a polyethylene, a poly(vinyl chloride), a polystyrene, an acrylic resin, a polyester resin, a poly (ethylene terephthalate), a poly(phenylene ether), a polybutylene terephthalate), a nylon, a polyamide, a polycarbonate, a polyacetal, a poly(phenylene sulfide), or a poly(ether ether ketone). Those resins may be used alone, or at least two types thereof may be used in combination. The additives to be supplied from the additive supply portion 52 may be in the form of fibers or powder.

In addition, the binding material to be supplied from the additive supply portion 52 may be a water-soluble resin, such as a cellulose derivative or a processed starch, or may be a gelatin or an agar.

In addition, as the additives to be supplied from the additive supply portion 52, besides the resin which binds the fibers, in accordance with the type of sheet to be manufactured, a colorant which colors fibers, an aggregation suppressor which suppresses aggregation of fibers and/or resin particles, and/or a flame retardant which enables fibers and the like to be hardly combustible may also be contained. A mixture passing through the mixing portion 50 is transported to the deposition portion 60 through the tube 54.

After the deposition portion 60 introduces the mixture passing through the mixing portion 50 from an inlet port 62, the entangled defibrated material are disentangled and allowed to fall down while being dispersed in air. Furthermore, when the resin of the additives to be supplied from the additive supply portion 52 is in the form of fibers, the deposition portion 60 disentangles the entangled resin. Accordingly, the deposition portion 60 is able to uniformly deposit the mixture on the second web forming portion 70.

The deposition portion 60 includes a drum portion 61 and a housing portion 63 receiving the drum portion 61. As the drum portion 61, a rotatable cylindrical sieve is used. The drum portion 61 has a net and allows fibers and/or particles which are contained in the mixture passing through the mixing portion 50 and which are smaller than an opening size of the net to fall down. The structure of the drum portion 61 is, for example, the same as that of the drum portion 41.

In addition, the "sieve" of the drum portion 61 may not have a function to sort a specific object. That is, the "sieve" to be used as the drum portion 61 indicates a member provided with a net, and the drum portion 61 may allows all of the mixture introduced thereinto to fall down.

The second web forming portion 70 deposits a passing material passing through the deposition portion 60 to form a web W. The second web forming portion 70 includes, for example, the mesh belt 72, the tension rollers 74, and the suction mechanism 76.

While being transferred, the mesh belt 72 allows the passing material passing through openings of the deposition portion 60 to deposit. The mesh belt 72 is stretched by the tension rollers 74 and has the structure in which air is supplied so that the passing material is not likely to pass. The mesh belt 72 is transferred by the rotation of the tension rollers 74. While the mesh belt 72 is continuously transferred, the passing material passing through the deposition portion 60 is allowed to continuously fall down and deposit, so that the web W is formed on the mesh belt 72.

The suction mechanism 76 is provided under the mesh belt 72. The suction mechanism 76 can generate a downward air stream. By the suction mechanism 76, the mixture dispersed in air by the deposition portion 60 can be sucked on the mesh belt 72. Accordingly, a discharge rate from the deposition portion 60 can be increased. Furthermore, by the suction mechanism 76, a downflow can be formed in a path in which the mixture falls, and the defibrated material and the additives are prevented from being entangled with each other during the falling.

As described above, since passing through the deposition portion 60 and the second web forming portion 70, the web W can be formed so as to be softly expanded with a large amount of air incorporated therein. The web W deposited on the mesh belt 72 is transported to the sheet forming portion 80.

In addition, in the example shown in the drawing, a moisture control portion 78 which controls moisture of the web W is provided. The moisture control portion 78 can control a mass ratio between the web W and water by adding water or water vapor to the web W.

The sheet forming portion 80 forms a sheet S by applying pressure and heat to the web W deposited on the mesh belt 72. In the sheet forming portion 80, since heat is applied to a mixture of the defibrated material and the additives mixed in the web W, the fibers in the mixture can be bound to each other with the additives interposed therebetween.

The sheet forming portion 80 includes a pressure application portion 82 pressuring the web W and a heating portion 84 heating the web W pressurized by the pressure application portion 82. The pressure application portion 82 is formed of a pair of calendar rollers 85 and applies a pressure to the web W. Since the web W is pressurized, the thickness thereof is decreased, and the bulk density of the web W is increased. As the heating portion 84, for example, there may be used a heating roller machine, a hot press forming machine, a hot plate, a hot wind blower, an infrared heater, or a flash fixing device. In the example shown in the drawing, as the heating portion 84, a pair of heating rollers 86 is provided. Since the heating portion 84 is formed of the heating rollers 86, compared to the case in which the heating portion 84 is formed as a plate-shaped press machine, the sheet S can be formed while the web W is continuously transported. The calendar rollers 85 and the heating rollers 86 are disposed, for example, so that the rotation shafts thereof are in parallel to each other. In this case, the calendar rollers 85 can apply a higher pressure to the web W than that to be applied to the web W by the heating rollers 86. In addition, the number of the calendar rollers 85 and the number of the heating rollers 86 are not particularly limited.

The cutting portion 90 cuts the sheet S formed by the sheet forming portion 80. In the example shown in the drawing, the cutting portion 90 includes a first cutting portion 92 cutting the sheet S in a direction intersecting the transportation direction of the sheet S and a second cutting portion 94 cutting the sheet S in a direction in parallel to the transportation direction. The second cutting portion 94 cuts, for example, the sheet S passing through the first cutting portion 92.

Accordingly, a single sheet S having a predetermined size is formed. The single sheet S thus cut is discharged to a discharge portion 96.

The fiber body forming apparatus 100 includes the defibrating machine 30. Hence, by the fiber body forming apparatus 100, the raw material can be defibrated at low energy.

4. Fiber Body Forming Method

Figure 4:
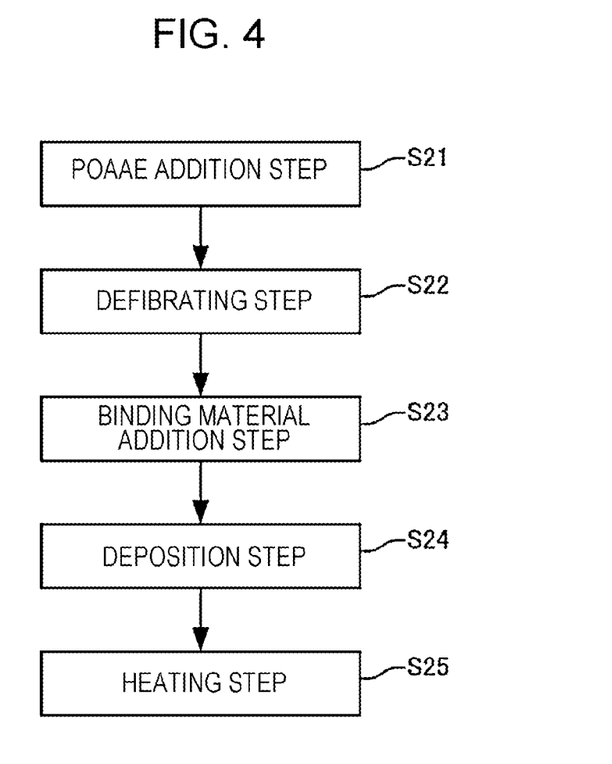
FIG. 4 is a flowchart illustrating a fiber body forming method according to this embodiment.

Next, a fiber body forming method according to this embodiment will be described with reference to the drawing. FIG. 4 is a flowchart illustrating the fiber body forming method according to this embodiment.

The fiber body forming method according to this embodiment is performed, for example, using the fiber body forming apparatus 100 described above. In addition, the fiber body forming method according to this embodiment may also be performed using an apparatus other than the fiber body forming apparatus 100.

As shown in FIG. 4, the fiber body forming method according to this embodiment comprises: a POAAE addition step (Step S21) of adding POAAE to a raw material containing fibers, a defibrating step (Step S22) of defibrating the raw material to which POAAE is added to form a defibrated material, a binding material addition step (Step S23) of adding a binding material to the defibrated material, a deposition step (Step S24) of depositing the defibrated material to which the binding material is added, and a heating step (Step S25) of heating the defibrated material which is deposited.

The POAAE addition step (Step S21) is performed, for example, using the addition portion 11 of the fiber body forming apparatus 100.

The defibrating step (Step S22) is performed, for example, using the defibrating portion 20 of the fiber body forming apparatus 100.

The binding material addition step (Step S23) is performed, for example, using the additive supply portion 52 of the fiber body forming apparatus 100.

The deposition step (Step S24) is performed, for example, using the deposition portion 60 of the fiber body forming apparatus 100.

The heating step (Step S25) is performed, for example, using the heating portion 84 of the fiber body forming apparatus 100.

The fiber body forming method according to this embodiment may further comprise, before the defibrating step (Step S22), a step of adding a cationic surfactant to the raw material. The step of adding a cationic surfactant to the raw material may be performed either before or after the POAAE addition step (Step S21), or POAAE and the cationic surfactant may be simultaneously added.

In addition, the fiber body forming method according to this embodiment may further comprise, besides the steps described above, for example, the steps described in the above "3. FIBER BODY FORMING APPARATUS", such as the step of pressurizing the web W by the pressure application portion 82.

In the fiber body forming method according to this embodiment, as described in "1. DEFIBRATING MACHINE", the raw material can be defibrated at low energy.

5. Examples and Comparative Examples

5.1. Formation of Liquid

Figure 5:
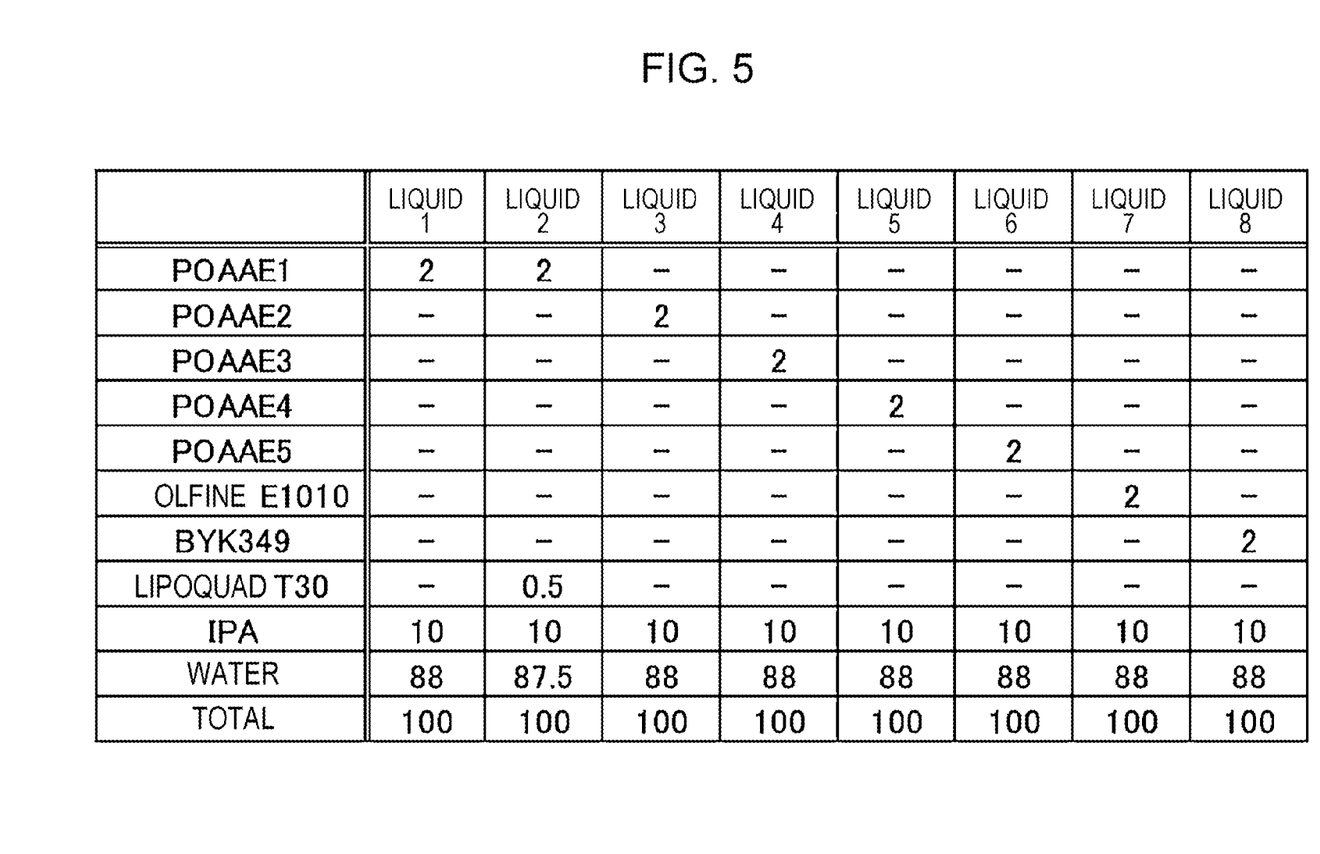
FIG. 5 is a table showing components of liquids 1 to 8.

Liquids 1 to 8 were formed. FIG. 5 is a table showing components of the liquids 1 to 8. The value shown in FIG. 5 indicates percent by mass.

In "POAAE1", R represents an alkyl group having 12 to 14 carbon atoms, and m=0 and n=5 hold. In "POAAE2", R represents an alkyl group having 6 carbon atoms, and m=10 and n=1 hold. In "POAAE3", R represents an alkyl group having 16 carbon atoms, and m=22 and n=10 hold. In "POAAE4", R represents an alkylaryl group having 22 carbon atoms, and m=16 and n=3 hold. In "POAAE5", R represents an alkenyl group having 8 carbon atoms, and m=6 and n=22 hold.

In addition, in FIG. 5, "Olfine E1010" is an acetylene surfactant manufactured by Nisshin Chemical Industry Co., Ltd. "BYK 349" is a polyether modified siloxane manufactured by BYK Japan KK. "Lipoquad T30" is stearyl trimethyl ammonium chloride manufactured by Lion Specialty Chemicals Co., Ltd. "IPA" represents isopropyl alcohol.

5.2. Formation of Defibrated Material

The liquids 1 to 8 were each applied to regenerated paper "G80" (basis weight: 64 g/cm$^2$) as a raw material manufactured by Mitsubishi Paper Mills Limited using an ink jet printer "EW-M770T" manufactured by Seiko Epson Corporation. Subsequently, 10 g of the raw material to which each of the liquids 1 to 8 was applied was defibrated using "HighSpeedMill HS-15" (number of revolutions: 30,000 rpm) manufactured by Labonect to form a defibrated material.

Figure 6:
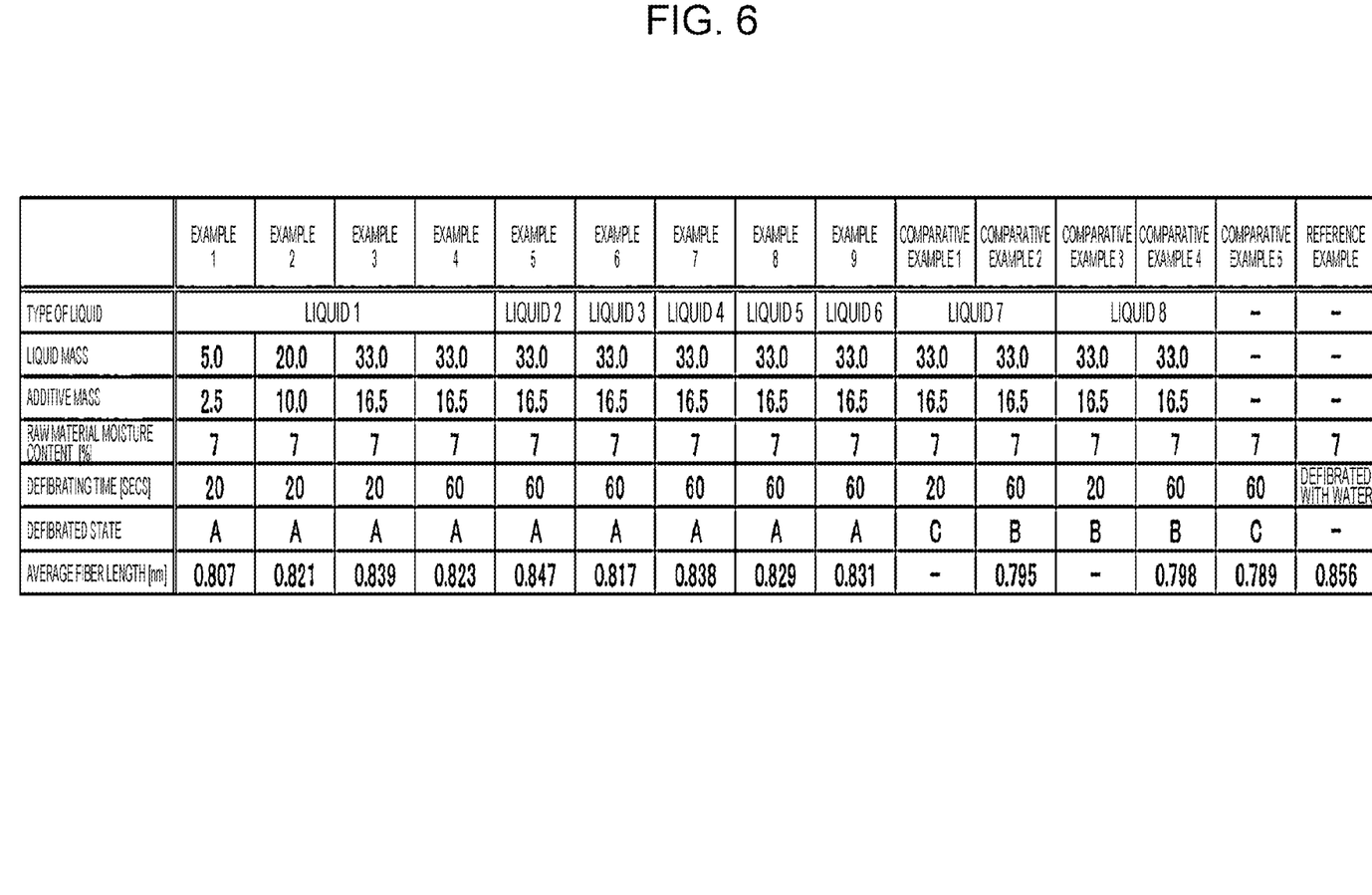
FIG. 6 is a table showing evaluation results.

FIG. 6 is a table showing defibrating conditions. In addition, as shown in FIG. 6, in Comparative Example 5 and Reference Example, the liquids 1 to 8 were not applied. In addition, in FIG. 6, a "liquid mass" represents the mass of each of the liquids 1 to 8 when the mass of a raw material having an A4 size is regarded as 100. An "additive mass" represents the mass of POAAE, Olfine E1010, or BYK 340 when the mass of the raw material is regarded as 100. A "raw material moisture content" is a moisture content of a raw material measured using "MX50" manufactured by A&D Company, Limited., the raw material being prepared such that after the liquids 1 to 8 were each applied, the raw material was dried at 105° C. for 3 hours and was then left over one night.

5.3. Evaluation

A defibrated state of the defibrated material formed as described above was evaluated. In particular, a defibrating rate was calculated from the amount of a defibrated material which was allowed to pass through a sieve having an opening of 1 mm. The evaluation result is shown in FIG. 6. The defibrating rate was calculated as shown below.

Defibrating rate (%)=mass of defibrated material passing through sieve/total mass of defibrated material processed by sieving×100

The defibrated state is evaluated in accordance with the following evaluation criteria.
A: defibrating rate of 95% or more
B: defibrating rate of 80% to less than 95%
C: defibrating rate of less than 80%

Furthermore, the average fiber length of the defibrated material was measured. In particular, using "Fiber Tester CODE 912" manufactured by L&W, the average fiber length of the defibrated material was measured in accordance with "ISO 16065-2: 2007". The measurement results are shown in FIG. 6. In addition, in FIG. 6, as Reference Example, the average fiber length obtained when the raw material was defibrated with water is also shown.

As shown in FIG. 6, compared to Comparative Examples 1 to 5 in each of which no POAAE was applied, the defibrated state was excellent in Examples 1 to 9 in each of which POAAE was applied. Accordingly, it is found that when POAAE is added to the raw material, defibration can be performed at low energy.

Furthermore, compared to Comparative Examples 1 to 5 in each of which no POAAE was applied, the average fiber length was long in Examples 1 to 9 in each of which POAAE was applied. Accordingly, it is found that when POAAE is added to the raw material, the average fiber length can be maintained longer. Furthermore, it is found that in Example 5 in which Lipoquad T30 is applied, the average fiber length can be maintained long as compared to that of each of the other examples.

In the present disclosure, within the scope including the features and the effects described in the present application, the structure may be partially omitted, and/or the embodiments and modified examples may be arbitrarily combined with each other.

The present disclosure is not limited to the embodiments described above and may be variously changed and/or modified. For example, the present disclosure includes substantially the same structure as the structure described in the embodiment. The substantially the same structure includes, for example, the structure in which the function, the method, and the result are the same as those described above, or the structure in which the object and the effect are the same as those described above. In addition, the present disclosure includes the structure in which a nonessential portion of the structure described in the embodiment is replaced with something else. In addition, the present disclosure includes the structure which performs the same operational effect as that of the structure described in the embodiment or the structure which is able to achieve the same object as that of the structure described in the embodiment. In addition, the present disclosure includes the structure in which a known technique is added to the structure described in the embodiment.

What is claimed is:
1. A fiber body forming method comprising:
  adding a compound represented by the following formula (1) to a raw material containing fibers;
  forming a defibrated material by defibrating the raw material to which the compound is added;
  adding a binding material to the defibrated material;
  depositing, on a web forming portion, the defibrated material to which the binding material is added; and
  heating the defibrated material after depositing the defibrated material on the web forming potion,

$$RO(O)_m(PO)_nH \quad (1)$$

wherein in the formula, R represents an alkyl or an alkenyl group having 6 to 22 carbon atoms or an alkylaryl group including an alkyl group which has 4 to 20 carbon atoms, E represents an ethylene group, P represents a propylene group, m and n each represent an average number of added moles, m represents the average number of 0 to 20, n represents the average number of 1 to 10, and $(EO)_m(PO)_n$ represents a block addition structure.

2. The defibrating method according to claim 1, wherein R has 8 to 16 carbon atoms.

3. The defibrating method according to claim 1, wherein in the adding a compound, the compound is added at 2.5 to 16.5 percent by mass with respect to the fibers.

4. The defibrating method according to claim 1, further comprising, before the forming a defibrated material, adding a cationic surfactant to the raw material.

\* \* \* \* \*